US005138831A

United States Patent [19]
Cowan, Sr.

[11] Patent Number: 5,138,831
[45] Date of Patent: Aug. 18, 1992

[54] AIR COOLED ROTARY COMBUSTION ENGINE

[76] Inventor: Howard H. Cowan, Sr., 3315 N. Godfrey #36, Midland, Tex. 79707

[21] Appl. No.: 666,018

[22] Filed: Mar. 7, 1991

[51] Int. Cl.$^5$ ............................................. F02C 3/16
[52] U.S. Cl. ...................................... 60/39.34; 60/726
[58] Field of Search ................ 60/39.34, 39.35, 39.44, 60/39.75, 726

[56] References Cited

U.S. PATENT DOCUMENTS

| | | | |
|---|---|---|---|
| 1,171,121 | 2/1916 | Heilmann | 60/39.34 |
| 1,291,273 | 1/1919 | Tyler | 60/39.34 |
| 3,145,533 | 8/1964 | Ollinger | 60/39.34 |

FOREIGN PATENT DOCUMENTS 324476  1/1930  United Kingdom ............... 60/39.44

Primary Examiner—Louis J. Casaregola
Attorney, Agent, or Firm—Fred N. Schwend

[57] ABSTRACT

An annular rotator is mounted between inner and outer stators and has a plurality of combustion chambers therein, each having an inlet port to receive a pressurized explosive fuel mixture from a source at one point in the rotation of the rotator and an exhaust port to later register with an exhaust opening in the outer stator when the fuel mixture is ignited. The intake ports later register with a source of pressurized air and the exhaust ports register with additional exhaust openings in the outer stator to purge and cool the combustion chambers and to subsequently pressurize the chambers.

4 Claims, 5 Drawing Sheets

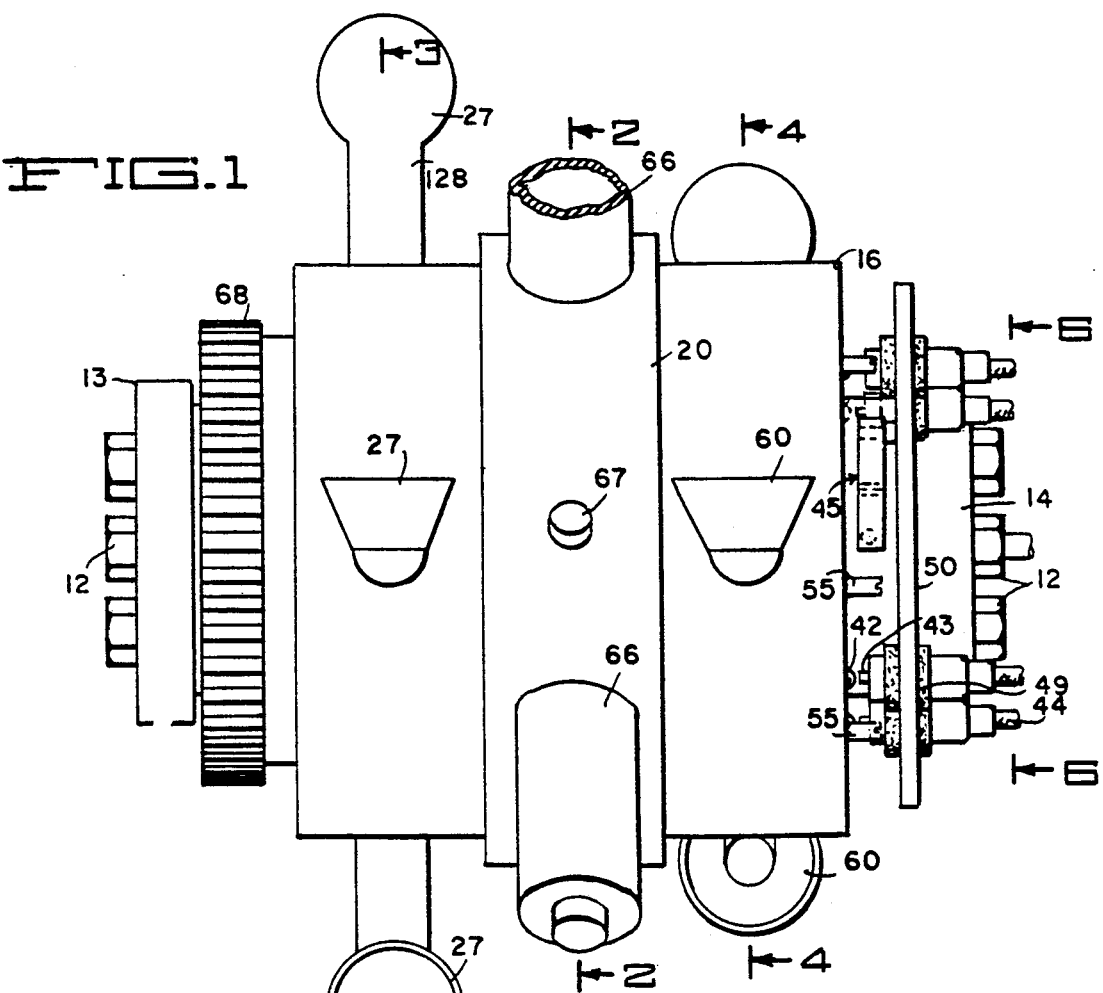
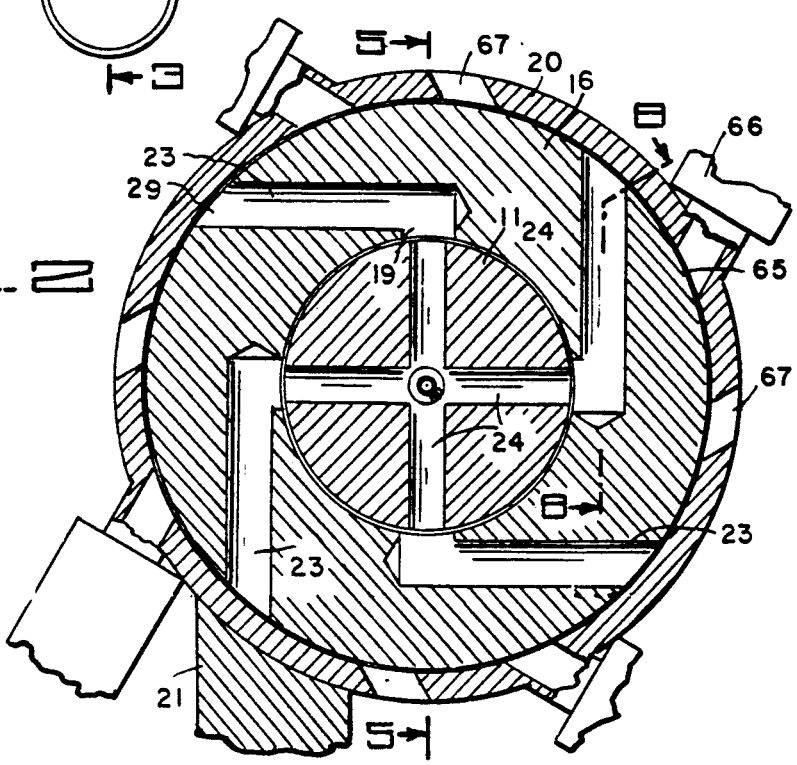

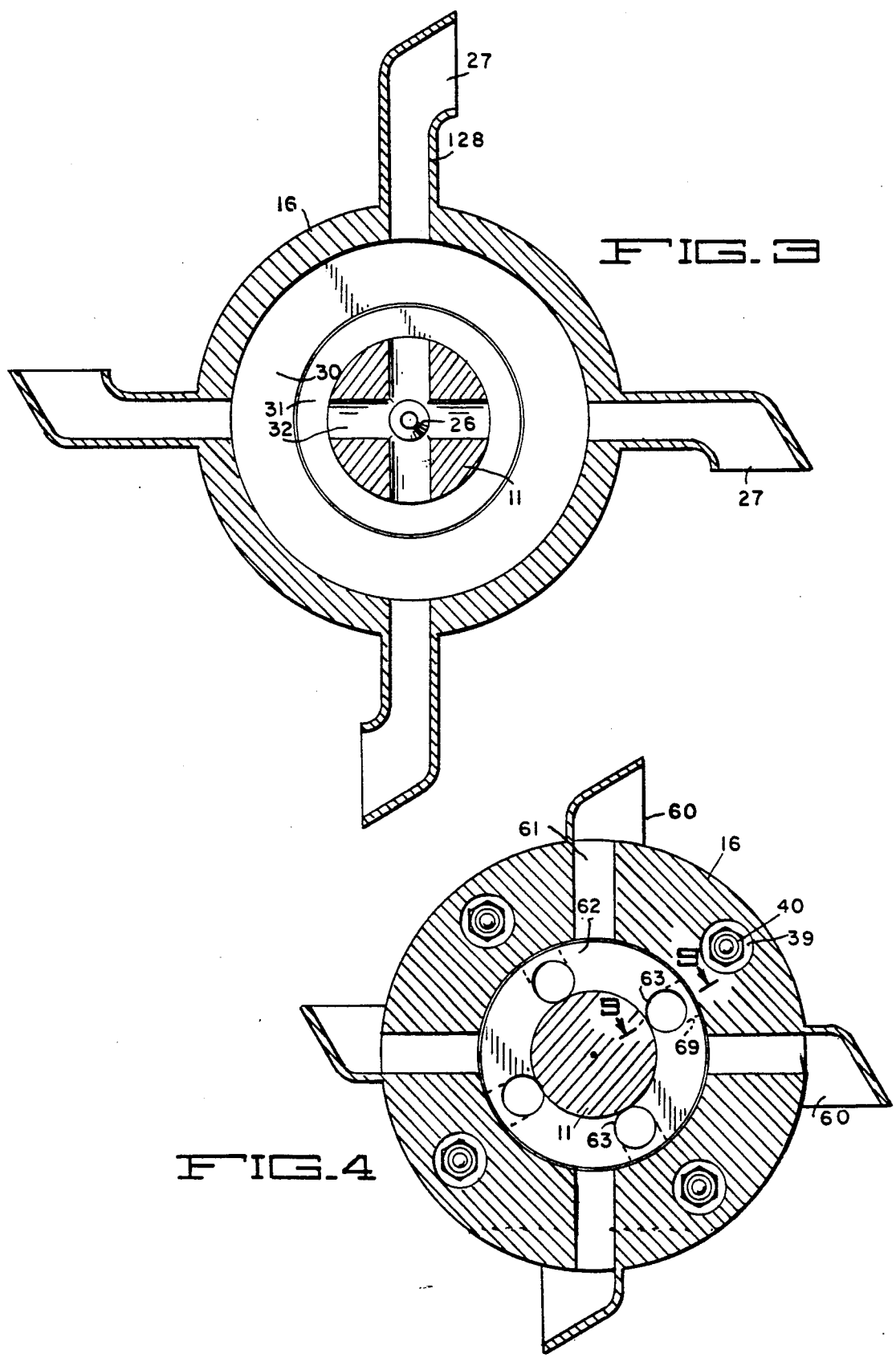

AIR COOLED ROTARY COMBUSTION ENGINE

BACKGROUND OF THE INVENTION

Field of the Invention

This invention relates to internal combustion engines and has particular reference to an air cooled rotary engine.

SUMMARY OF THE INVENTION

A principal object of the invention is to provide a high speed internal combustion rotary engine having improved means for increasing the thermal and mechanical efficiency thereof.

Another object is to provide an engine of the above type having a novel combustion chamber arrangement to effect improved efficiency and reduction of weight and size of the engine.

Another object is to provide an engine of the above type having improved air cooling facilities.

Another object is to at least substantially eliminate the usual friction and wear generating parts of an internal combustion engine, such as pistons, connecting rods, gears, cams, valves, seals, etc.

A further object is to provide an improved fuel injection system.

A further object is to eliminate reciprocating parts whereby high speeds can be obtained and wherein a high ratio of horse-power to weight and can be effected.

According to the invention, a high speed rotary engine is provided having relatively few moving parts and with no reciprocating parts and substantially no friction generating elements.

The improved engine comprises inner and outer stators with an annular rotator nested therebetween with a minimum clearance to substantially eliminate movement of air or gases along the lengths of the rotator and stators. Combustion chambers are formed in the rotator and have intake and exhaust ports which cover and uncover intake openings in the inner stator and exhaust openings in the outer stator in appropriate sequence. Compressed air derived from air scoops carried by the rotator convey an explosive fuel from a fuel injecting device through the intake openings whereby the compressed fuel mixture is directed into the combustion chambers. The fuel mixture is then ignited to produce a reactive force in which the ignited mixture is expelled through exhaust openings in the outer stator to drive the rotator. Subsequently, compressed air derived from additional air scoops also carried by the rotator is forced through the combustion chambers to purge and cool the same through additional exhaust openings in the outer stator. As the exhaust ports pass such additional exhaust openings, the combustion chambers are charged with compressed air and thereafter the cycle is repeated to ingest a new fuel mixture into the combustion chambers.

Since multiple combustion chambers are located around the rotator and multiple combustion cycles take place during each rotation, a relatively large number of power impulses occur during each rotation. For example, where four combustion chambers are formed in the rotator and a complete combustion cycle takes place during each one quarter rotation, sixteen power inpulses will occur during each such rotation.

BRIEF DESCRIPTION OF THE DRAWINGS

The manner in which the above and other objects of the invention are accomplished will be readily understood on reference to the following specification when read in conjunction with the accompanying drawings, wherein:

FIG. 1 is a plan view of an engine emboding a preferred form of the present invention.

FIG. 2 is a transverse sectional view taken along the line 2—2 of FIG. 1.

FIG. 3 is a transverse sectional view taken along the line 3—3 of FIG. 1.

FIG. 4 is a transverse sectional view taken along the line 4—4 of FIG. 1.

DESCRIPTION OF THE PREFERRED EMBODIMENT

Figure 5:
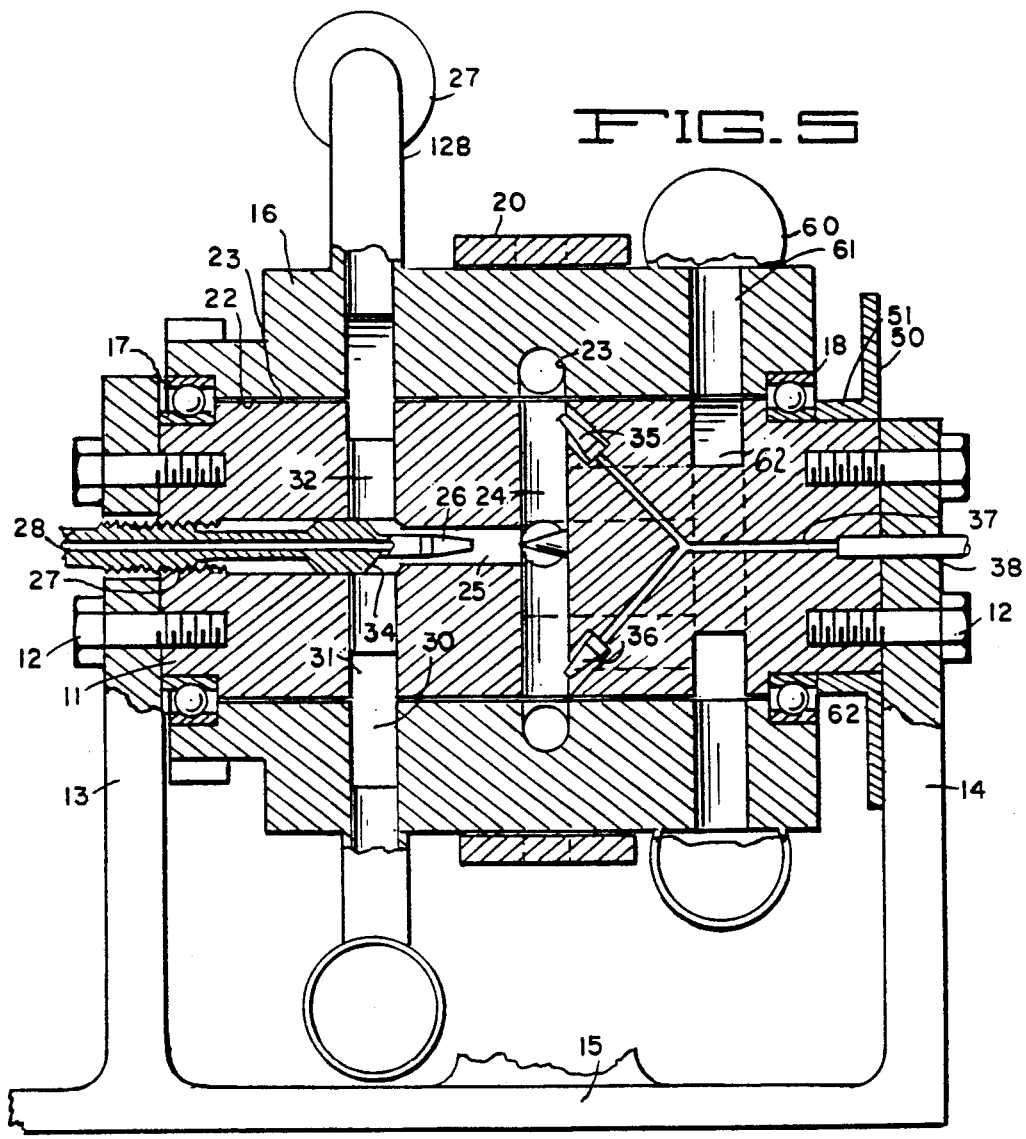
FIG. 5 is a longitudinal sectional view taken along the line 5—5 of FIG. 2.
Figure 6:
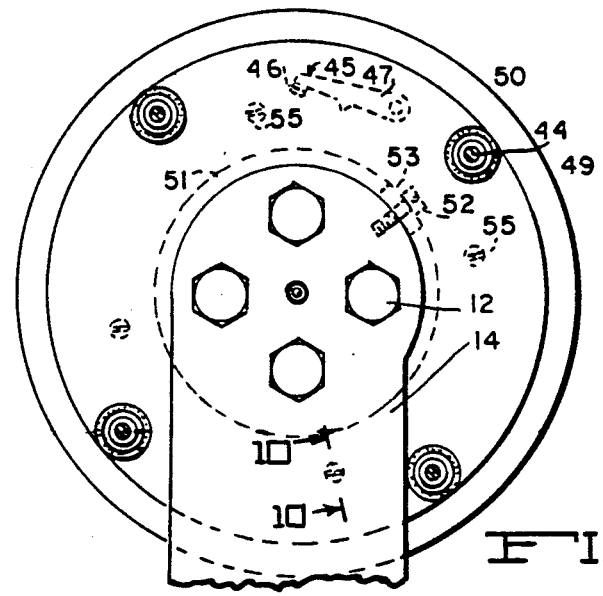
FIG. 6 is a transverse sectional view taken along the line 6—6 of FIG. 1.
Figure 7:
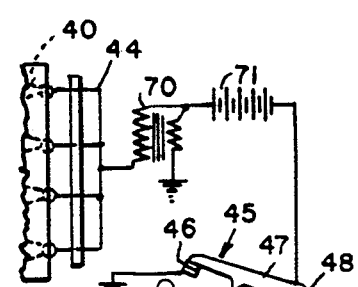
FIG. 7 is a schematic electrical diagram of the ignition system.
Figure 8:
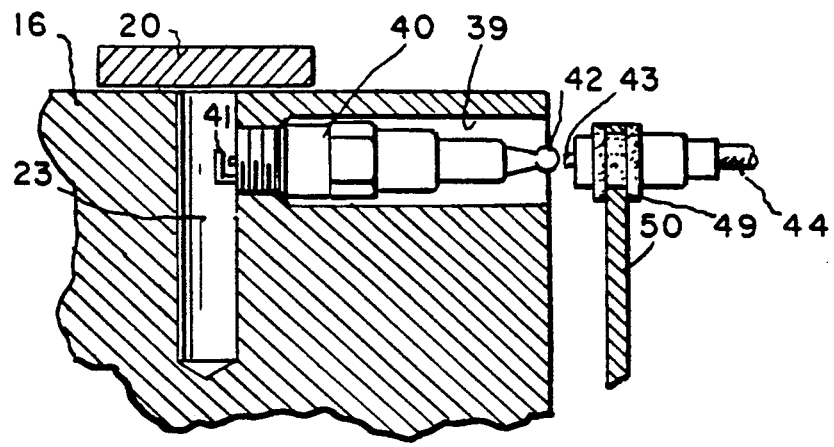
FIG. 8 is a sectional view taken along the line 8—8 of FIG. 2.

While this invention can be embodied in many different forms, there is shown in the drawings a preferred form and it should be understood that the present disclosure is to be considered only as an exemplification of the principals of the invention and is not intended to limit the invention to the embodiment illustrated. The scope of the invention will be pointed out in the appended claims.

Referring particularly to FIGS. 1, 2 and 5, the engine comprises an inner stator 11 secured at its ends to brackets 13 and 14 by bolts 12, the brackets upstanding from a base 15. An annular rotator 16 is rotatably mounted on the stator by sealed ball bearings 17 and 18. A centrally located outer stator or stator ring 20 is supported in a position surrounding the rotator 16 by a bracket 21 upstanding from the base 15.

It should be noted here that the inner bore surface 22 of rotator 16 lies closely adjacent to the outer cylindrical surface 23 of stator 11. Likewise, the inner bore surface of stator 20 lies closely adjacent to the outer surface of rotator 16. Preferably, the spacings are on the order of 0.003 inches or less. Also, stators 11 and 20 and rotator 16 are preferably formed of similar composite materials, such as ceramic-metal alloys having a minimum coefficient of thermal expansion so that the spacings will not vary appreciably during any temperature changes. I have discovered that by maintaining such minimum spacing, vertices are generated in the air film between the air boundary layers adhering to the facing surfaces of the rotator and stators, and when the rotator is revolving at relatively high speeds, such vertices substantially prevent or at least greatly slow down air from travelling lengthwise along the lengths of the facing surfaces.

The outer stator 20 overlies a set of four elongate equi-angularly spaced cylindrical combustion chambers 23 formed in rotator 16. Such chambers are offset from the axis of rotation of rotator 16 and each is formed with an intake port 19 opening onto the surface of stator 11 and an exhaust port 29 opening onto the inner bore of the outer stator 20.

It will be noted that the axes of chamber 23 extend tangentially of a circle which is concentric with the axis of rotation of the rotator 16.

Four radially extending fuel intake passages 24 are formed in stator 11 in the paths of the combustion chambers 23 and such passages communicate with an axial inlet passage 25 in which a cold start fuel injection valve 26 is mounted. The latter is screw threaded at 27 in the passage 25 and has a fuel channel 28 therein to transmit a liquid fuel, such as gasoline, under pressure from an external source (not shown) to an orifice in the valve.

For the purpose of passing air under pressure over the valve 26 to provide an air-fuel mixture to be directed to the combustion chambers 23, air scoops or funnels 27 (see also FIG. 3) are mounted on tubular extensions 28 communicating with aligned annular channels 30 in rotator 16 and 31 in stator 11. Radially extending passages 32 in stator 11 connect passages 31 with the axial passage 25. Thus, when rotator 16 is revolving in a clockwise direction as viewed in FIG. 3 air pressure will be developed and air forced past valve 26 where it will be mixed with fuel to form a fuel mixture which is directed to radial passages 24 and into the combustion chambers 23.

The amount of air-fuel mixture fed into the combustion chambers 23 may be varied by adjusting the valve 26 along passageway 25, thereby causing a throttle shoulder 34 thereon to regulate the amount of air inducted into the passage 25.

Four fuel injection valves, two of which are shown at 35 and 36, are equi-angularly spaced around stator 11 and open into the intake passages 24 adjacent to the outer periphery of the stator. Such nozzles are connected through passages 37 and tubing 38 to a suitable source of fuel under pressure.

Other controls (not shown) may be used in accordance with conventional fuel injection systems to control the valves 26, 35, 36, etc.

Referring now to FIGS. 1, 6, 7 and 8, a set of four conventional spark plugs 40 are mounted in cavities 39 in rotator 16 with their sparking electrodes 41 extending into respective ones of the combustion chambers 23. Electrical terminals 42 of the spark plugs 40 are arranged in a circle concentric with the axis of rotator 16 and are carried in a circular path opposite four equi-spaced high voltage terminals 43. The latter are mounted on a stationary plate 50 by insulators 49 and are connected to conducters 44 (see also FIG. 7) to the secondary winding of a high voltage transformer 70. The primary winding of the latter is in circuit with a battery 71 and a circuit breaker generally indicated at 45 (see also FIG. 1). The latter may be of conventional construction comprising normally closed circuit breaker contacts 46, one of which is stationary and the other is carried by an arm 47 pivotally supported at 48 by plate 50.

The plate 50 is formed with a hub 51 rotatably mounted on the right hand end of stator 11. The plate 50 may be adjusted about the axis of stator 11 to effect a desired ignition timing and may be locked in position by a lock screw 52 which extends through an arcuate slot 53 in hub 51 and is threaded into the stator 11.

Figure 10:
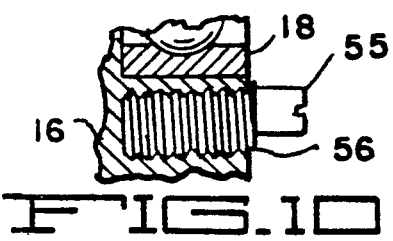
FIG. 10 is an enlarged fragmentary sectional view showing one of the contact camming pins and is taken along the line 10—10 of FIG. 6.

Opening of the timer contacts 46 to effect sparking across the spark plug electrodes 41 is effected four times during each revolution of the rotator 16 by four equi-angularly spaced camming pins 55. The pins 55 are preferably individually adjustable and for this purpose, each pin is eccentrically formed integral with a screw threaded body 56 (FIG. 10) threaded into the rotator 16.

Figure 9:
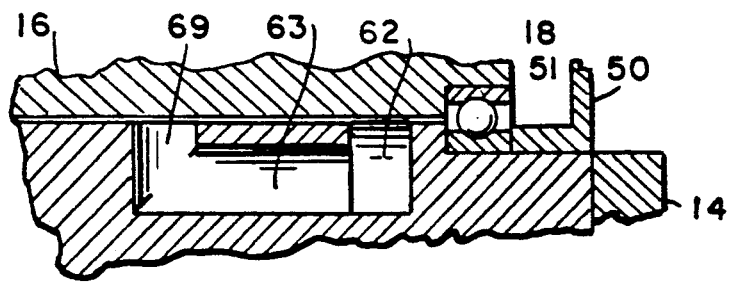
FIG. 9 is a sectional view taken along the line 9—9 of FIG. 4.

Referring in particular to FIGS. 1, 4 and 5, a second set of air scoops 60 are mounted on rotator 16 to apply air pressure for purging, cooling and compressing air in the combustion chambers 23 as will be described later. The scoops 60 communicate through respective radial passages 61 with an aligned annular groove 62 in stator 11. Groove 62 opens into four equi-angularly spaced cross channels 63 (FIGS. 4 and 9) which terminate in short radial purging and cooling passages 69. The latter open into the bore 22 of rotator 16 and are located in the paths of the combustion chamber ports 19.

Referring to the FIGS. 1 and 2, equi-angularly spaced exhaust openings 65 are formed through the wall of outer stator 20 in the paths of the exhaust ports 29 of the combustion chambers 23 and each communicates with the respective noise muffler 66 mounted on the stator 20. Also, four similarly spaced purging openings 67 are formed through the wall of the outer stator 20 in the paths of the combustion chamber ports 29.

A gear 68 is formed on rotator 16 for transmitting rotation from the rotator to a desired power utilization device (not shown) and for transmitting rotation to the rotator from a suitable power device to start the engine.

Figure 11:
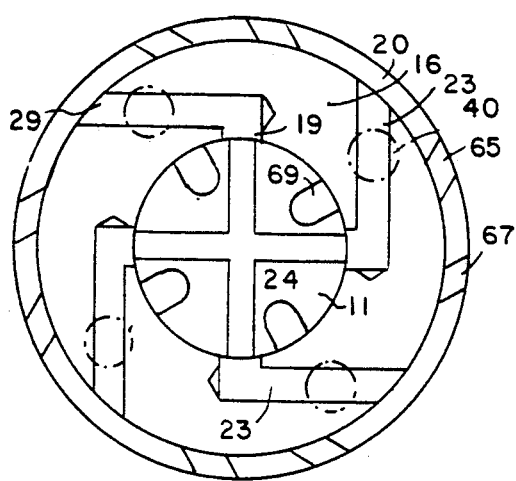
FIGS. 11 to 14 are schematic views illustrating the various operating phases of the engine during one cycle thereof.

Describing now the operation of the engine, the latter progresses through four phases during each cycle. The drawings show the engine in a first or "fuel injection and added compression" stage. Such stage is depicted in FIG. 11 and, when reaching such position, each compression chamber 23 contains a certain amount of compressed air remaining from a preceding cycle in which air derived from the air scoops 60 partly charged the combustion chambers.

Figure 12:
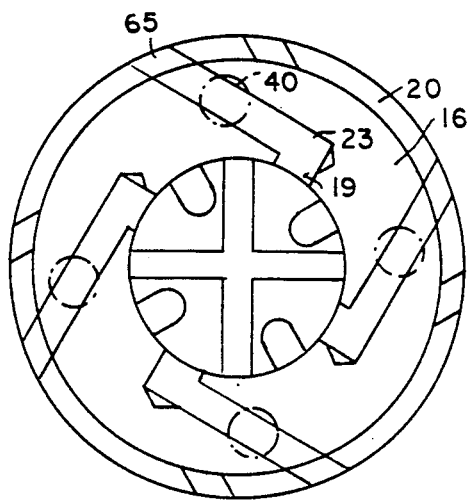

It will be noted that the air scoops 27 extend radially outward a greater distance than the scoops 60 and therefore they generate an amount of air pressure greater than that produced by the air scoop 60 to force air over the fuel nozzle 26 and through the radial intake passages 24 and into the now aligned ports 19 of combustion chambers 23, thus developing greater compression in the latter chambers. As the rotator 16 rotates clockwise through 30 degrees it moves into its firing phase (FIG. 12) at which time the combustion chamber ports 19 are sealed and the sparks plugs 40 are fired. The combustion chambers 23 at this time register with exhaust openings 65 and detonation occurs to develop a driving reaction to propel the rotator 16 further clockwise.

Figure 13:
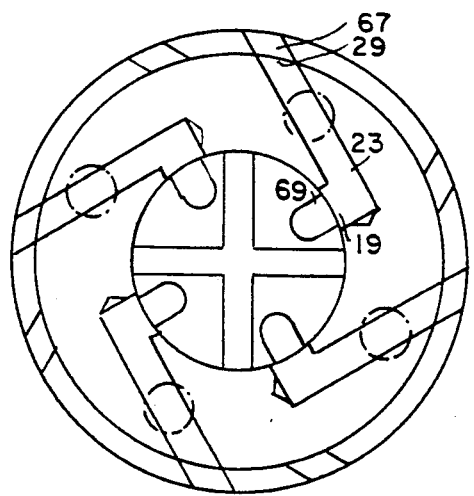

As the rotator 16 rotates further clockwise through an additional angle of 30 degrees it moves into its purging and cooling stage (FIG. 13) wherein the combustion chamber ports 19 register with passages 69 and exhaust ports 29 register with purging openings 67 to enable compressed air from the scoop 60 to purge and cool the combustion chambers.

Figure 14:
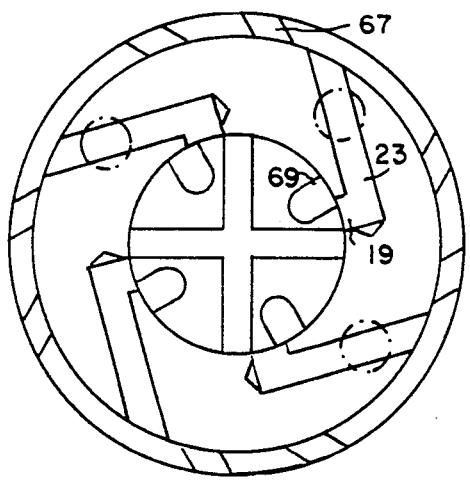

Continued clockwise movement of rotator 16 through approximately 15 degrees moves the combustion chambers into their compression stage (FIG. 14) causing them to be sealed from the purging ports 67 while their intake ports 19 remain open to passages 69 to receive a charge of compressed air from the air scoops 60. Thus, the combustion chambers are partially charged with compressed air as they move into their initial "fuel injection-added compression" stage (FIG. 11) of the next engine cycle.

It will be seen from the foregoing that I have provided a simple and compact air cooled rotary engine which is devoid of any reciprocating, sliding and friction generating elements, thereby increasing the thermal and mechanical efficiency and increasing the horsepower-to-weight ratio. Also, it will be seen 16 power impulses will occur during each rotation of the engine. However, obviously, a greater or less number of impulses per rotation can be obtained by providing a greater or less number of combustion chambers and related intake and exhaust passages.

It will be further seen that since the power impulses generated in the combustion chambers are directed away from the axis of rotation of the rotator 16, correspondly less load will be applied to the bearings 17 and 18. Also, the engine requires no lubrication other than that applied to the sealed bearings 17 and 18. Further, because of its unique design, the engine comprises a minimum number of parts and, therefore, a minimum number of fastening devices for assembling the parts.

I claim:

1. A rotary internal combustion engine comprising
an inner stator,
an outer stator,
an annular rotator rotatable between said stators in air sealing relation therewith,
means in said rotator forming a combustion chamber having an intake port opening onto said inner stator and having an exhaust port opening onto said outer stator,
means forming an intake opening in said inner stator for conveying an explosive fuel,
said intake opening being located in the path of said intake port,
means forming an exhaust opening in said outer stator, said exhaust opening being located in the path of said exhaust port,
fuel ignition means for igniting fuel in said combustion chamber when said intake port moves out of communication with said intake opening and said exhaust port moves into communication with said exhaust opening,
means forming a purging opening in said inner stator,
means for transmitting pressurized air to said purging opening,
said purging opening being located in the path of said intake port, and
a second exhaust opening in said outer stator in the path of said exhaust port,
said exhaust port communicating with said second exhaust opening when said intake port communicates with said purging opening whereby to purge and cool said combustion chamber.

2. A rotary internal combustion engine comprising
an inner stator,
an outer stator,
an annular rotator rotatable between said stators in air sealing relation therewith,
means in said rotator forming a combustion chamber having an intake port opening onto said inner stator and having an exhaust port opening onto said outer stator,
means forming an intake opening in said inner stator for conveying an explosive fuel,
said intake opening being located in the path of said intake port,
means forming an exhaust opening in said outer stator,
said exhaust opening being located in the path of said exhaust port,
fuel ignition means for igniting fuel in said combustion chamber when said intake port moves out of communication with said intake opening and said exhaust port moves into communication with said exhaust opening,
said fuel conveying means comprising a fuel injecting device, and
an air scoop carried by said rotator for collecting air under pressure and for conveying said pressurized air past said fuel injecting device to said intake opening.

3. An engine as defined in claim 1 wherein said pressurized air transmitting means comprises an air scoop carried by said rotator for collecting air under pressure.

4. An engine as defined in claim 1 wherein said purging opening remains in communication with said intake port after said exhaust port passes out of communication with second exhaust opening whereby to enable said pressurized air to pressurize said combustion chamber.

* * * * *